3,109,862
PRODUCTION OF ALKYLATED DECABORANES
Murray S. Cohen, Dover, and Carl E. Pearl, Morristown, N.J., assignors, by mesne assignments, to Thiokol Chemical Corporation, a corporation of Delaware
No Drawing. Filed July 1, 1955, Ser. No. 519,625
6 Claims. (Cl. 260—606.5)

This invention relates to the manufacture of liquid mono and polyalkyl decaboranes.

More particularly it relates to the manufacture of alkyl decaboranes by the treatment of decarborane in a non-reactive solvent with a metal alkyl and subsequent addition of boron trifluoride or its etherate. The order of addition is critical and the reaction should be carried out in two stages. In the first stage of the process of the present invention, the metal alkyl, suitably dissolved in a non-reactive solvent, is added to decaborane dissolved in a similar or different non-reactive solvent. Alternatively, the reagents of the first stage can be combined in the reverse order. In either case, from about 0.5 to 3 moles of metal alkyl are used per mole of decaborane. When monoalkyl decaboranes are desired, approximately one mole of metal alkyl per mole of decaborane is preferably used. The proportion of metal alkyl can be reduced to about 0.5 or less when the monoalkyl derivative is the preferred product but lower conversions must suffice. When the production of mixed polyalkyl decaboranes is preferred larger proportions of the metal alkyl, up to about 3 moles or more per mole of decaborane, can be used.

During the reaction, gas evolution occurs and the gas is largely the alkane derived from the metal alkyl. In starting the reaction it is advantageous to maintain an inert atmosphere over the reactants. For this purpose any non-reactive gas can be used including nitrogen or argon. The reaction occurs without substantial evolution of heat and proceeds rapidly at atmospheric temperatures. Generally, the reaction temperature will be within the range from $-80$ to $100°$ C.

In the second stage of the reaction, boron trifluoride or its etherate is added to the primary reaction product. Preferably the proportion of boron trifluoride is about one mole per mole of decaborane initially used but this can vary from about 0.5 to 5 moles of $BF_3$. No significant improvement in yield appears to result from the use of these larger proportions but the yield may be reduced by the use of proportions much lower than 1:1.

The $BF_3$ is suitably added in solution in ether or in an inert solvent which may be the same or different from that used in the initial stage of the reaction provided it is non-reactive with metal alkyls. The addition can be carried out at any temperature between $-70$ and $100°$ C. but preferably at about $-10$ to $30°$ C. The inert gaseous atmosphere used in the first stage is preferably continued in the second stage. Advantageously the reaction mixture is refluxed after the $BF_3$ has been added in order to improve the yield. A short reaction time of one hour or less appears to be sufficient but the yield is somewhat improved by longer periods of reflux, for example, up to 18 hours or more.

After completion of the reaction the product in solution in the organic solvent is removed from the inorganic solids, for example, by filtration or decantation. The latter are extracted with additional quantities of solvent and the extracts are combined with the original organic solution. The alkylated product is recovered by distillation of the extract. Suitably the alkyl decaborane is vacuum distilled.

Suitable metal alkyls, generally alkali metal alkyls and containing not more than five carbon atoms in each alkyl radical, are prepared in known manner from the alkyl halide and metal, for example, sodium or lithium in anhydrous ether or by any other suitable method. Examples of suitable metal alkyls include methyl lithium, ethyl lithium, n-butyl sodium, diethyl magnesium and methyl magnesium bromide. Thus by the term metal alkyls, we mean to include the dialkyl magnesium compounds and the Grignard reagents as well as alkali metal alkyls.

The process of the present invention is carried out in a suitable solvent, which does not react with metal alkyls or boron hydrides. Saturated hydrocarbons including aliphatic hydrocarbons, for example, n-pentane, iso-octane, 2,2,4-trimethylpentane can be used. Ethers, sufficiently stable to metal alkyls including lower dialkyl ethers such as dimethyl ether, methyl ethyl ether, diethyl ether and diisopropyl ether and tetrahydrofurane, are suitable. Alicyclic and aromatic hydrocarbons, including lower alkyl benzenes, are also useful, including benzene, toluene, xylene, ethylbenzene, cyclohexane and methylcyclopentane.

The process of the present invention has the advantage that substantially atmospheric pressures and substantially atmospheric temperatures are used and no dangerous pressures are formed provided the by-product gases are suitably vented from the reaction vessel.

*Example I*

In a 1-liter three necked flask equipped with a dropping funnel, thermometer and a reflux condenser, all under a head of dry nitrogen, was placed a solution of 32.2 g. (0.264 mole) of decaborane in 300 ml. of dry ether. Stirring was effected by means of a magnetic stirrer and the flask was cooled to $-75°$ C. A solution of 0.264 mole of ethyl lithium in 260 ml. of ether was introduced over a period of one hour and the temperature was maintained at $-75°$ for an additional hour. A solution containing 87.4 g. (0.615 mole) of boron trifluoride etherate in 150 ml. of ether was then introduced during one hour. The temperature was maintained at $-75°$ for an additional two hours and then allowed to return to room temperature. The ether was removed on a water bath and 450 ml. of benzene was added. The distillation was continued until the temperature of the distilling vapors reached $78°$. The reaction mixture was cooled and the yellow benzene solution was separated from the precipitated solids by decantation. Distillation of the benzene solution gave a fraction, B.P. $97-115°$ C. at 3.5 mm., which weighed 9.3 g. This material was ethyldecaborane containing 10–15 percent by weight of free decaborane. If desired, the ethyldecaborane can be further purified by repeated fractionation.

The compositions produced in accordance with our invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The compositions produced in accordance with our invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varies from a maximum at static sea level conditions to a minimum at the absolute ceiling of the aircraft, which may be 65,000 feet of 70,000 feet or higher. The compression ratios of the current and near-future aircraft gas turbines are generally within the range from 5:1 to 15:1 or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch at static sea level conditions to about 5 to 15 pounds per square inch absolute at the extremely high altitudes of approximately 70,000 feet. The products produced in accordance with our invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon produced in accordance with the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels produced in accordance with the present invention, the local fuel to air ratio in the zone of fuel injection should also be approximately stoichiometric, assuming that the boron, carbon and hydrogen present in the products burn to boric oxide, carbon dioxide and water vapor. In the case of the ethyldecaborane containing about 72 percent by weight of boron, for example, this local fuel to air ratio by weight is approximately 0.072. For the higher energy fuels produced in accordance with the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the products produced in accordance with the present invention are employed in essentially the same manner as the simple hydrocarbon fuel presently being used. The fuel is injected into the combustor in such manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600–1650° F. Operations at these peak temperatures is limited to periods of approximately five minutes at take-off and climb and approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The products produced in accordance with out invention can also be employed as aircraft gas turbine fuels in admixture with the hydrocarbons presently being used, such as JP–4. When such mixtures are used, the fuel-air ratio in the zone of the combustor where combustion is initiated and the overall fuel-air ratio across the combustor will be proportional to the relative amounts of borohydrocarbon and hydrocarbon fuel present in the mixture, and consistent with the air dilution required to maintain the gas temperatures of these mixtures within accepted turbine operating temperatures.

Because of their high chemical reactivity and heating values, the products produced in accordance with our invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme conditions of altitude operations with conventional aircraft fuels.

The burning characteristics of the products produced in accordance with our invention are such that good combustion performance can be attained even at the marginal operating conditions encountered at high altitudes, insuring efficient and stable combustion and improvement in the zone of operation before lean and rich extinction of the combustion process is encountered. Significant improvements in the non-afterburning performance of a gas turbine-afterburner combination is also possible because the high chemical reactivity of the products produced in accordance with our invention eliminates the need of flameholding devices within the combustion zone of the afterburner. When employed in an afterburner, the fuels produced in accordance with our invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The products produced in accordance with our invention will improve the combustion process of the ramjet in much the same manner as that described for the afterburner because of their improved chemical reactivity over that of simple hydrocarbon fuels. When employed in a ramjet the fuels produced in accordance with our invention will be simply substituted for hydrocarbon fuels and used in the established manner.

We claim:

1. A method for the preparation of a liquid alkyldecaborane which comprises reacting decaborane and from 0.5 to 3 moles, per mole of decaborane, of a metal alkyl selected from the group consisting of alkali metal alkyls containing from 1 to 5 carbon atoms, magnesium dialkyls containing not more than 5 carbon atoms and alkyl magnesium halides containing from 1 to 5 carbon atoms at a temperature of −80 to 100° C. while the decaborane is in solution in an organic solvent which is inert under the reaction conditions, adding from 0.5 to 5 moles, per mole of decaborane, of a material selected from the group consisting of boron trifluoride and boron trifluoride etherate to the reaction mixture and continuing the reaction at a temperature of −70 to 100° C.

2. The method of claim 1 wherein the metal alkyl is an alkali metal alkyl.

3. The method of claim 1 wherein said material is boron trifluoride etherate.

4. The method of claim 1 wherein said solvent is a lower dialkyl ether.

5. The method of claim 1 wherein said solvent is benzene.

6. The method of claim 1 wherein said metal alkyl is ethyl lithium and wherein said material is boron trifluoride etherate.

No references cited.